United States Patent Office 3,595,876
Patented July 27, 1971

3,595,876
SPIRO-AZATETRAMETHYLENE DERIVATIVES
Cornelis Albertus de Bock and Joseph Lucas Maria Antonius Schlatmann, Van Houtenlaan, Weesp, Netherlands, assignors to U.S. Philips Corporation, New York, N.Y.
No Drawing. Filed July 3, 1968, Ser. No. 742,130
Claims priority, application Netherlands, July 6, 1967, 6709380; Apr. 5, 1968, 6804904
Int. Cl. C07d 27/04
U.S. Cl. 260—326.8   6 Claims

ABSTRACT OF THE DISCLOSURE

Spiro-azatetramethylene derivatives of adamantane have been found to have useful antivirus properties.

---

The antiviral activity of compounds in vivo may be determined by means of tests on mice. During such tests a dose of the substance to be tested is orally administered to 8 mice daily during 7 days. At the first day of administration the animals are infected with a virus which is clouded in cages in which the mice are housed. Since it is difficult to ascertain whether the animals fall ill or not, a dose of virus is administered such that all of the mice die during the test. As a matter of fact, this dose is a manifold of that with a natural infection.

The mice which have died are counted twice a day. The number of dead mice and the instants of dying are compared with the data obtained with a group of 18 mice which had been infected but did not receive the substance to be tested. By means of the Wilcoxon method it can then be calculated whether the substance has a significant antiviral effect.

By means of this test the antiviral activity of inter alia 1- and 2-amino adamantane was shown.

It has been found that spiro-azatetramethylene derivatives of Formula I

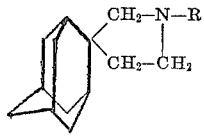

I and acid-additive salts thereof with pharmaceutically acceptable acids have a very strong antiviral activity. In Formula I, R is a hydrogen atom, an n-alkyl group having up to 3 carbon atoms, or propargly group.

However, it has surprisingly been found that it was impossible to kill all of the treated mice with the lethal dose of virus. Seven out of the eight animals remained alive.

It is very remarkable that the substances already show a significant antiviral activity if administered solely at the day of infection instead of during 7 days, as appeared from another test.

In a comparative test with influenze virus $A_2$-Japan it has furthermore been found that the substances have an antiviral activity which is stronger than that of 1-amino adamantane.

They are also active against Rhino virus, as has been found from tests with a tissue culture.

The fact that not all of the treated mice were killed may be an indication of very low toxicity of the substances.

Very active substances that should be mentioned are 2,2-(2 - azatetramethylene)-adamantan and 2,2-(n-methyl - 2 - azatetramethylene)-adamantane, together with their acid-addition salts derived from pharmaceutically acceptable acids.

Examples of such acids are inter alia: inorganic acids, such as halogen hydrogen acids, sulphuric acid, nitric acid, phosphoric acid, organic acids, such as acetic acid, citric acid, tartaric acid, sulphaminic acid, p-toluene sulphonic acid, succinic acid, fumaric acid, oxalic acid, benzoic acid and the like.

Compounds according to the invention may be used for combating virus infections, more particularly infections with influenza-A viruses and Rhino virus, and notably for preventing virus infections. The administration of a substance according to the invention to animals may be started as soon as a virus infection has become manifest. Satisfactory results are obtained, especially if a substance is administered as soon as infection threatens or as soon as weather conditions make an early infection probable. It is therefore preferable to administer a dose of one of the compounds daily during the winter months.

Since a vaccination gives immunity only after three weeks, the compounds may also be administered together with a vaccine giving protection during the first three weeks after vaccination.

The compounds can be either injected or administered orally or rectally. However, oral administration is preferred.

For animals a dosage of from 10 to 100 mg./kg./day and preferably 40 mg./kg./day is most commonly employed.

The compounds of Formula I may be prepared by methods which are known for the manufacture of this kind of compounds and by methods analogous therewith.

Accordingly the invention also relates to a method of preparing new spiro-azatetramethylene derivatives and is characterized in that compounds of Formula I

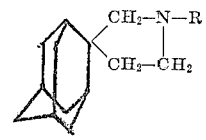

I and salts thereof with pharmaceutically acceptable acids, acids, in which formula R is a hydrogen atom, an n-alkyl group having up to 3 carbon atoms or a propargyl group, are prepared by methods which are known for the preparation of this kind of compounds or by methods analogous thereto.

Thus, compounds of Formula II

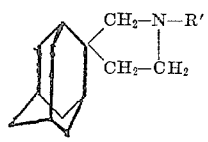

II and their salts, where R' is a hydrogen atom or an n-alkyl group having up to 3 carbon atoms, are obtained by reducing a compound of Formula III

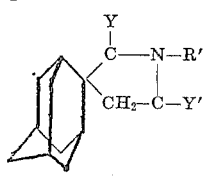

III where Y and Y' are double-bonded oxygen atoms or one of them represent two hydrogen atoms. This reduction may be carried out with hydrides, such as $LiAlH_4$, $NaAlH_4$, or $NaBH_4$ plus $AlCl_3$, in an inert solvent, such as an ether, for example diethyl ether, dioxane, tetrahydrofuran, diglyme, etc.

Compounds of Formula III, in which Y and Y' are each a double bonded oxygen atom, may be manufactured by starting from adamantanone and cyano acetic acid which are reacted with each other by the Cope method. Treating the resultant adamantylidenecyano acetic acid with KCN in methanol results in 2-cyano-2- cyanomethyl adamantane which may be saponified with concentrated sulphuric acid to form the dicarbonamide. This substance may be formed by means of 50% hydrochloric acid into the acid anhydride, which may be converted with the aid of R'NH₂ into a compound of Formula III.

Compound of Formula III, where Y is a double-bonded oxygen atom and X' represents two hydrogen atoms, may also be obtained from 2 - cyano - 2 - cyanomethyl adamantane. To this end, the substance is hydrogenated with hydrogen and Raney-nickel to obtain 2 - cyano - 2 - (2-aminoethyl) adamantane which is alkylated, if desired, with an alkyl chloride having up to 3 carbon atoms. The nitrile group is subsequently hydrolysed with sulphuric acid and the resulting 2-(2-aminoethyl) adamantane carboxylic acid-2 is cyclised with thionylchloride or dicyclohexylcarbodiimide.

Compounds of Formula III, where Y represents two hydrogen atoms and Y' represents a double-bonded oxygen atom, may also be obtained when starting from admantanone. To this end, this substance is reacted, according to Reformatzki, with an ester of bromine acetic acid. A molecule of water is extracted from the reaction product with the aid of, for example, thionylchloride in pyridine. The resulting adamantylidene-acetic acid ester is subsequently saponified with lye and converted into the acid chloride using PCl₃ in benzene. The reaction product may be converted into the corresponding acetimide with the aid of ammonia or an amine R'NH₂. The resulting substance may then be converted into the desired compound using dimethyloxosulphonium - methylide in dimethylsulphoxide.

Compounds of Formula IV

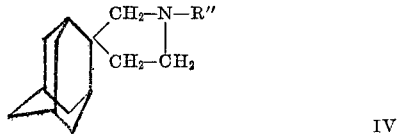

IV and their salts, where R''' represents an n-alkyl group to 3 carbon atoms or a propargyl group, may be manufactured by alkylating 2,2-(2-azatetramethylene)adamantane. This may be effected by reacting the substance with a halide R''Hal or a sulphate R''₂SO₄, preferably in an alkaline inert solvent, for example, in triethylamine, pyridine, KOH or K₂CO₃ in benzene or methanol.

Compounds of Formula V

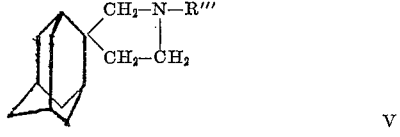

V and their salts, where R''' represents an n-alkyl group having up to 3 carbon atoms, may also be manufactured by reductively alkylating 2,2 - (2-azatetramethylene)adamantane. This reaction may be carried out with formaldehyde, acet -aldehyde, propionaldehyde and, for example, Pt/H₂, Raney-nickel/H₂, formic acid, NaBH₄ or the like.

The compounds of Formula V can also be obtained by acylating and then reducing 2,2-(2-azatetramethylene) adamantane. To this end, the substance may be reacted with either formic acid or the anhydride or a halide of acetic acid or propionic acid. The resulting amide may be reduced, for example, with hydride, for example, LiAlH₄.

2,2-(N-propargyl - 2 - azatetramethylene)adamantane and its salts may be manufactured by splitting off hydrobromide from a compound of Formula VI

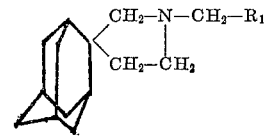

IV where R₁ represents the group —CBr=CH₂ or the group —CHBr—CH₂Br. The reaction may be carried out with NaNH₂ in fluid ammonia or in toluene, xylene and the like. The substance of Formula VI in which R₁ represents the group —CHr=CH₂ may be obtained by coupling 2,2 - (2-azatetramethylene)adamantane with 2,3-dibromo propene-1 and the substance of said formula in which R₁ represents the group —CHBr—CH₂Br by reacting 2,2 - (N-allyl - 2 - azatetramethylene)adamantane, manufactured by a method described for the synthesis of compounds of Formula III, with bromine in water.

2,2-(N-propargyl - 2 - azatetramethylene)adamantane can also be manufactured by reacting 2,2-(2-azatetramethylene)adamantane with formaldehyde and acetylene. The reaction may be carried out at a temperature between 30° C. and 40° C. and an acetylene pressure of ±10 atm. under the influence of cuprochloride in acetic acid. 2,2-(2-azatetramethylene)-adamantane and its salts may, at least, be obtained by heating salts of 2-aminoethyl - 2 - aminoethyl adamantane to temperatures above their melting point. This reaction may be carried out in the absence of a solvent.

The substances may be given a form suitable for administration in the usual manner. Thus they can be mixed with, or dissolved in, inert solid or fluid carrier materials. It is thus possible to obtain tablets, pills, coated tablets, suppositoria, powders, suspensions, injection liquids, capsules and the like. If desired, it is possible to provide them with other medicines, vitamins or dyes.

Suitable carrier materials are, for example, water, glycerin, chalk, calcium phosphate, lactose and powded sugar (saccharose) or mixtures of these substances. The use of sugars as carrier material affords the advantage of a pleasing taste.

Tablets and coated tablets may also contain swelling agents which readily cause disintegration of the composition in water. As such may be used, for example, potato starch, maize starch, arrow root (amylun marantae), carboxy methyl cellulose. Furthermore lubricants can be used, such as talc, magnesium stearate and calcium stearate.

Compounds such as, for example, methyl-p-hydroxybenzoate, propyl-p-hydroxybenzoate and benzyl alcohol may be added as preservatives. Suitable surface-active substances are, for example, mono- or tri-esters of, for example, lauric acid, palmitic acid, stearic acid, ricinic acid and oleic acid with a poly-alcohol such as, for example, sorbitan, manitan, mannide and glycerol and also polyoxyethylene derivatives of inter alia the said esters.

Preparations according to the invention may have, for example, the following compositions:

Suspension for injection

|  | Gms. |
|---|---|
| 2,2-(2-azatetramethylene)adamantane | 100 |
| Methyl-p-hydroxybenzoate | 1.80 |
| Propyl-p-hydroxybenzoate | 0.20 |
| Sodium chloride | 9.0 |
| Polysorbate 80 U.S.P. | 4.0 |
| Water up to 1000 mls. | |

Tablet

| | Mgs. |
|---|---|
| 2,2-(2-azatetramethylene)adamantane.HCl | 200 |
| Lactose | 335 |
| Potato starch | 60 |
| Talc | 25 |
| Magnesium stearate | 5 |
| Gelatin | 5 |

Suppository

| | Mgs. |
|---|---|
| 2,2 - (2 - azatetramethylene)-adamantane.sulphuric acid | 200 |
| Suppository mass | 1500 |

Manufacture of injection liquid 1.80 gms. of methyl-p-hydroxybenzoate, 0.20 gm. of propyl-p-hydroxy-benzoate and 9.0 gms. of sodium chloride were dissolved in 500 mls. of boiling water for injection. Another 300 mls. of water for injection were added to the solution, followed by cooling to 30° C. The resulting solution had added to it a solution of 4.0 gms. of polysorbate 80 U.S.P. in water of 40° C. for injection. The mixture was stirred until a homogeneous liquid was obtained and then cooled down to 20° C. The pH-value was adjusted between 6.9 and 7.1 using 0.1 N-hydrochloric acid p.a., whereafter the solution was supplemented with water for injection up to 1000 mls. The solution was filtered through a Jena G3-glass filter, sterilized in an autoclave (for ½ hour at 110° C.) and cooled to room temperature, while stirring, under aseptic conditions. 100 gms. of 2,2-(2-azatetramethylene) adamantane with a particle size of 1 m$\mu$ to 10 m$\mu$ were sterilized by dry heating at 150° C. for 1 hour. After cooling, the substance was suspended in 800 mls. of the liquid obtained in accordance with the above prescription. The suspension was supplemented with a similar liquid up to 1000 mls., stirred until it was homogeneous and worked up into ampoules of 2 mls. each.

Manufacture of tablets 200 gms. of 2,2-(N-methyl-2-azatetramethylene)-adamantane HCl, 335 gms. of lactose and 30 gms. of potato starch were mixed until a homogeneous mixture was obtained. The mixture was wetted with a 10% solution of gelatin in water. The moist mass was granulated and dried at 45° C., whereafter the mass was again granulated. Subsequently the granules were mixed with 25 gms. of talc, 5 gms. of stearate and 30 gms. of potato starch. The resulting mixture was compressed to form tablets of 650 mgm. each.

Manufacture of coated tablets

The manufacture of coated tablets was carried out in a similar manner as for tablets, except that biconvex instead of flat tablets were formed and provided with a sugar and glassy layer.

Manufacture of suppositories 200 gms. of 2,2-(2-azatetramethylene)-adamantane sulphuric acid sieved through a 100-mesh sieve were added, while stirring, to 150 gms. of suppository mass heated to 37° C. After a homogeneous paste had been obtained, the mixture was worked up into suppen forms of 1.5 mls. each.

EXAMPLES (1a) Adamantylidene-2-cyanoacetic-acid ethylester 11.3 gms. of cyanoacetic-acid ethyl ester and a hot solution of 0.7 gm. of ammonium acetate in 1.14 mls. of glacial acetic acid were added to 15 gms. of adamantanone dissolved in 50 mls. of benzene. The mixture was boiled with reflux, while stirring, for 3 hours. The water produced was collected in a water separator. The benzene layer was washed once with a solution of soda and washed twice with water. The benzene was dried on $MgSO_4$ and then removed in vacuo. The residue was recrystallised from 75% ethanol. Melting point between 80.5° C. and 82° C.

(1b) 2-cyano-2-cyanomethyladamantane 64 gms. of KCN in 140 mls. of water were added to a solution of 100 gms. of adamantylidene-2-cyanoacetic-acid ethyl ester in 800 mls. of ethanol. The mixture was stirred at 65° C. for 16 hours. After cooling, the deposit was sucked off, washed with 75% ethanol and dried on a steam bath. The filtrate was evaporated to a small volume. The resulting solid material was filtered, washed with 50% ethanol and dried.

A second amount of substance was obtained from the residue by shaking it with 450 mls. of water and 50 mls. of 2 N KOH, then shaking with diethylether and evaporating the ether solution to dryness. Melting point of the two fractions between 126.5° C. and 128° C.

(1c) 2,2-(2-oxa-1,3-diketotetramethylene)adamantane 76 gms. of 2-cyano-2-cyanomethyladamantane were dissolved in 750 mls. of concentrated sulphuric acid heated to 90° C. The solution was shaken for 5 minutes and then poured on 12 litres of ice. The liquid was neutralised with 50% natron lye, followed by heating above steam for 1 hour. The solid material was than filtered, washed with water and dried. The resulting substance was then introduced into 2 litres of concentrated hydrochloric acid and heated above steam. After the substance had dissolved completely, there was heated for another 1½ hours. After cooling, the deposit was sucked off and washed with water. The substance was dissolved in 4 litres of boiling benzene, the benzene layer was separated from a water layer formed and cooled down to 10° C. The crystallisate was sucked off and washed with benzene. Melting point between 226° C. and 229° C.

(1d) 2,2-(2-aza-1,3-diketotetramethylene)adamantane 52.1 gms. of 2,2-(2-oxa-1,3-diketotetramethylene)adamantane were melted in an atmosphere of ammonia, the ammonia being passed through at a rate of 4 litres/hour for 4 hours. The substance was recrystallised from ½ litre of ethanol. Melting point between 187° C. and 189° C.

(1e) 2,2-(2-azatetramethylene)adamantane.HCl 40 gms. of $LiAlH_4$ were dissolved in 1 litre of absolute tetrahydrofuran. 45.1 gms. of 2,2-(2-aza-1,3-diketotetramethylene)adamantane were added in small portions to this solution, followed by refluxing for 85 hours. The complexes were subsequently decomposed using 55 mls. of water, the hydroxides sucked off, boiled twice with half a litre of diethylether and again sucked off. 90 mls. of 2½ N HCl were added to the filtrate and the washing liquids. The liquid was evaporated in vacuo to 100 mls. and then heated to boiling point. After cooling, the crystallisate was sucked off, washed with ethanol and dried above KOH. Melting point between 252° C. and 254° C.

(2a) 2-(N-methylcarboxamidomethyl)-2-carboxyadamantane 6.60 gms. of 2,2-(2-oxa-1,3-diketotetramethylene)adamantane were dissolved in 100 mls. of hot benzene and added, while stirring, to an equimolar amount of methylamine in 60 mls. of benzene heated to a temperature between 60° C. and 65° C. After stirring for half an hour at 60° C., the deposit was sucked off and washed with benzene. Melting point between 209° C. and 210° C.

(2b) 2,2-(N-methyl-2-aza-1,3-diketotetramethylene) adamantane 6 gms. of 2-(N-methylcarboxamidomethyl)-2-carboxyadamantane were heated in an atmosphere of nitrogen up to 15° C. above its melting point for 30 minutes. The substance, after cooling, was recrystallised from ethanol. Melting point between 214° C. and 216° C.

(2b) 2,2-(N-methyl-2-azetetramethylene) adamantane·HCl 5 gms. of 2,2-(N-methyl-2-aza-1,3-diketo-tetramethylene)-adamantane were dissolved in 100 mls. of tetrahydrofuran. LiAlH$_4$ was added to the solution in a 100% excess, followed by refluxing for 3 days. The complexed were then decomposed with the aid of approximately 6 mls. of water. The deposited hydroxides were sucked off, boiled twice with 50 mls. of ether and then filtered. The collected filtrates were added to 10 mls. of 2½ N alcoholic hydrochloric acid. The mixture was evaporated in vacuo to 10 mls. and then heated to boiling. Ethanol was added to an amount such that a clear solution is obtained. After the solution had been evaporated to dryness, the residue was crystallised from ethanol/benzene 1:1. Melting point between 267° C. and 268° C.

(3) 2,2-(N-methyl-2-azatetramethylene) adamantane hydrochloride 2 mls. of a Formalin solution (37%) and 200 mgs. of platinum oxide were added to a solution of 1.2 gms. of 2,2-(2-azatetramethylene)adamantane in 5 mls. of 96% ethanol. The reaction mixture was shaken under H$_2$ (4 at.) for 16 hours, whereafter the catalyst was filtered off. The filtrate was acidified with hydrochloric acid and then evaporated to dryness in vacuo. After crystallisation of the resulting residue from ethanol/diethylether 1:1 2,2-(N-methyl-2-azatetramethylene) - adamantane hydrochloride was obtained. Melting point between 265° C. and 267° C.

(4a) 2,2-(N-acetyl-2-azatetramethylene)adamantane 2.45 gms. of 2,2-(2-azatetramethylene)adamantane were dissolved in 5 mls. of acetic acid anhydride. The reaction mixture was heated to 100° C. and, after cooling, poured into 15 mls. of water. After heating at 80° C. for several minutes and cooling to room temperature, the reaction mixture was extracted with chloroform. The extract was washed with a solution of sodium bicarbonae and with water and, after drying, on sodium sulphate evaporated to dryness. The residue is crystallised from petroleum ether (40° C.–50° C.) at −20° C. The product obtained had a melting point between 43° C. and 45° C.

(4b) 2,2-(N-ethyl-2-azatetramethylene) adamantane hydrochloride 2.37 gms. of 2,2 - (N - acetyl - 2 - azatetramethylene) adamantane was added in small portions to a stirred suspension of 1 gm. of LiAlH$_4$ in 40 mls. of absolute tetrahydrofuran. After the reaction mixture had been boiled for 16 hours under a reflux cooler with the exclusion of moisture, it was cooled down, whereafter a mixture consisting of 3 mls. of tetrahydrofuran and 3 mls. of water is slowly dropped in while stirring. The reaction mixture was then sucked and the residue intensely washed with absolute tetrahydrofuran. The filtrate was acidified with a solution of HCl in diethylether. The crystallised product was filtered and recrystallised from ethanol/diethylether 1:1. A substance was obtained having a melting point between 266° C. and 268° C.

(5) 2,2-(N-propargyl-2-azatetramethylene) adamantane hydrochloride 16.44 gms. of 2,2-(2-azatetramethylene)adamantane were dissolved in 50 mls. of absolute ethanol and 35 mls. of triethylamine were added to the solution. Subsequently 17 gms. of propargylbromide were dropped in, while cooling in ice and stirring, within ±5 minutes. The reaction mixture was heated to boiling and cooled down immediately thereafter to room temperature. Crystallised product was sucked off. The filtrate was evaporated to dryness and 50 mls. of water were added to the residue. The resulting emulsion was extracted with the aid of diethylether and, after washing with water and drying on Na$_2$SO$_4$, the extract was acidified with etheric hydrochloric acid. The deposit produced was sucked off and crystallised twice from water. A crystalline product was obtained having a melting point between 225° C. and 226° C. (sealed tube).

(6a) 2-aminoethyl-2-aminomethyladamantane-dihydrochloride 6 mls. of 3.85 n-alcoholic hydrochloric acid and 200 mgs. of platinum oxide were added to a solution of 2 gms. of 2-cyano-2-cyanomethyl adamantane in 24 mls. of ethanol. The reaction mixture was shaken under H$_2$ (4 at.) for 16 hours, followed by filtering off the catalyst. The filtrate was evaporated to dryness in vacuo. Crystallisation of the resulting residue from ethanol/diethylether (1:1) yielded 2-aminoethyl-2-aminomethyladamantane dihydrochloride of melting point 281° C. to 283° C.

(6b) 2,2-(2-azatetramethylene)adamantane·HCl 1.5 gms. of 2-aminoethyl-2-aminomethyl-adamantane dihydrochloride were heated to 350° C. in a metal bath for 30 minutes. The residue was dissolved in water and washed once with 15 mls. of diethylether. The aqueous solution was made basic by adding 6 mls. of 2 N NaOH and extracting twice with diethylether. The collected extracts were washed once in water, dried on magnesium sulphate and acidified with alcoholic hydrochloric acid to produce a weakly acid reaction. The crystallised product was filtered off and recrystallised from ethanol/diethylether (1:1). The resulting product melted at 252° C. to 254° C.

What is claimed is:
1. A compound of the formula

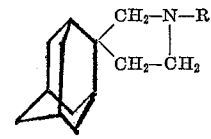

wherein R is hydrogen, n-alkyl of up to 3 carbon atoms or propargyl and salts thereof with pharmaceutically acceptable acids.

2. As a compound of claim 1, 2,2-(2-azatetramethylene)adamantane and salts thereof with pharmaceutically acceptable acids.

3. As a compound of claim 1, 2,2-(N-methyl-2-azatetramethylene)adamantane and salts thereof with pharmaceutically acceptable acids.

4. As a compound of claim 1, 2,2-(N-ethyl-2-azatetramethylene)adamantane and salts thereof with pharmaceutically acceptable acids.

5. As a compound of claim 1, 2,2-(N-n.propyl-2-azatetramethylene)adamantane and salts thereof with pharmaceutically acceptable acids.

6. As a compound of claim 1, 2,2-(N-propargyl-2-azatetramethylene)adamantane and salts thereof with pharmaceutically acceptable acids.

References Cited

UNITED STATES PATENTS 3,257,456  6/1966  Smith _____ 260—586

ALEX MAZEL, Primary Examiner

J. A. NARCAVAGE, Assistant Examiner

U.S. Cl. X.R.

260—326.5, 343.6, 464, 514, 563; 424—274